(12) United States Patent
Younkin

(10) Patent No.: US 12,088,441 B2
(45) Date of Patent: Sep. 10, 2024

(54) SYSTEMS AND METHODS FOR REAL-TIME FREQUENCY SHIFT DETECTION

(71) Applicant: Panasonic Intellectual Property Management Co., Ltd., Osaka (JP)

(72) Inventor: Duane Younkin, Ashburnham, MA (US)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 57 days.

(21) Appl. No.: 18/149,246

(22) Filed: Jan. 3, 2023

(65) Prior Publication Data
US 2024/0223419 A1 Jul. 4, 2024

(51) Int. Cl.
  *H04L 27/12* (2006.01)
  *H04L 27/26* (2006.01)
(52) U.S. Cl.
  CPC ........ *H04L 27/127* (2013.01); *H04L 27/2657* (2013.01)
(58) Field of Classification Search
  CPC .................... H04L 27/127; H04L 27/2657
  See application file for complete search history.

(56) References Cited

U.S. PATENT DOCUMENTS

| 7,369,004 B2 | 5/2008 | Partridge et al. |
| 2006/0049878 A1 | 3/2006 | Kawabe et al. |
| 2014/0354262 A1* | 12/2014 | Chen ............... H03L 7/095 |
| | | 324/76.82 |

FOREIGN PATENT DOCUMENTS

JP  2006-080909 A  3/2006

OTHER PUBLICATIONS

International Search Report of PCT application No. PCT/JP2023/046008 dated Mar. 12, 2024.

* cited by examiner

*Primary Examiner* — Rahel Guarino
(74) *Attorney, Agent, or Firm* — PEARNE & GORDON LLP

(57) ABSTRACT

Systems and methods disclosed herein include a correction circuit. The correction circuit may include signal conditioning circuitry that is configured to condition a received reference signal. The correction circuit may include a filter that is configured to filter the conditioned signal received from the signal conditioning circuitry. The correction circuit may include phase detector circuitry that is configured to generate at least one output signal based on measuring a phase shift between a received plurality of input signals. At least one of the plurality of input signals may include the conditioned signal received from the filter.

20 Claims, 7 Drawing Sheets

SYSTEMS AND METHODS FOR REAL-TIME FREQUENCY SHIFT DETECTION

TECHNICAL FIELD

The present disclosure relates to frequency shift detection, and more particularly, to systems and methods for real-time frequency shift detection in resonator-based oscillators via a filter.

BACKGROUND

Timing is at the core of many electronics applications, ranging from data acquisition to telecommunications. Oscillators may be used as clocks to offer high-precision timing for these electronics applications. The core parameters of timing oscillators may include cost, power consumption, size, precision, accuracy, frequency stability over temperature, jitter, and phase noise, with different applications requiring different specifications for each of these parameters. High performance applications, such as computer networking and telecommunications, require clocks with very low jitter and very high temperature stability, often at the expense of cost and size. These and other deficiencies exist.

BRIEF SUMMARY

Embodiments of the present disclosure provide a correction circuit. The correction circuit may include signal conditioning circuitry that is configured to condition a received reference signal. The correction circuit may include a filter that is configured to filter the conditioned signal received from the signal conditioning circuitry. The correction circuit may include phase detector circuitry that is configured to generate at least one output signal based on measuring a phase shift between a received plurality of input signals. At least one of the plurality of input signals may include the conditioned signal received from the filter.

Embodiments of the present disclosure provide a method. The method may include transmitting a reference signal. The method may include conditioning the reference signal. The method may include filtering the conditioned reference signal. The method may include transmitting the filtered conditioned signal. The method may include measuring a phase shift between the filtered conditioned signal and a second signal. The method may include generating an output signal including a frequency correction signal. The method may include transmitting the frequency correction signal.

Embodiments of the present disclosure provide an oscillator. The oscillator may include a mechanical resonator. The oscillator may include a correction circuit. The oscillator may include output conditioner circuitry. The correction circuit may include signal conditioning circuitry that is configured to condition a reference signal received from the mechanical resonator. The correction circuit may include a filter that is configured to filter the conditioned signal received from the signal conditioning circuitry. The correction circuit may include phase detector circuitry that is configured to generate at least one output signal based on measuring a phase shift between a received plurality of input signals. At least one of the plurality of input signals may comprise the conditioned signal received from the filter. The phase detector circuitry may be further configured to transmit the at least one output signal to the output conditioner circuitry.

DETAILED DESCRIPTION

Figure 1:
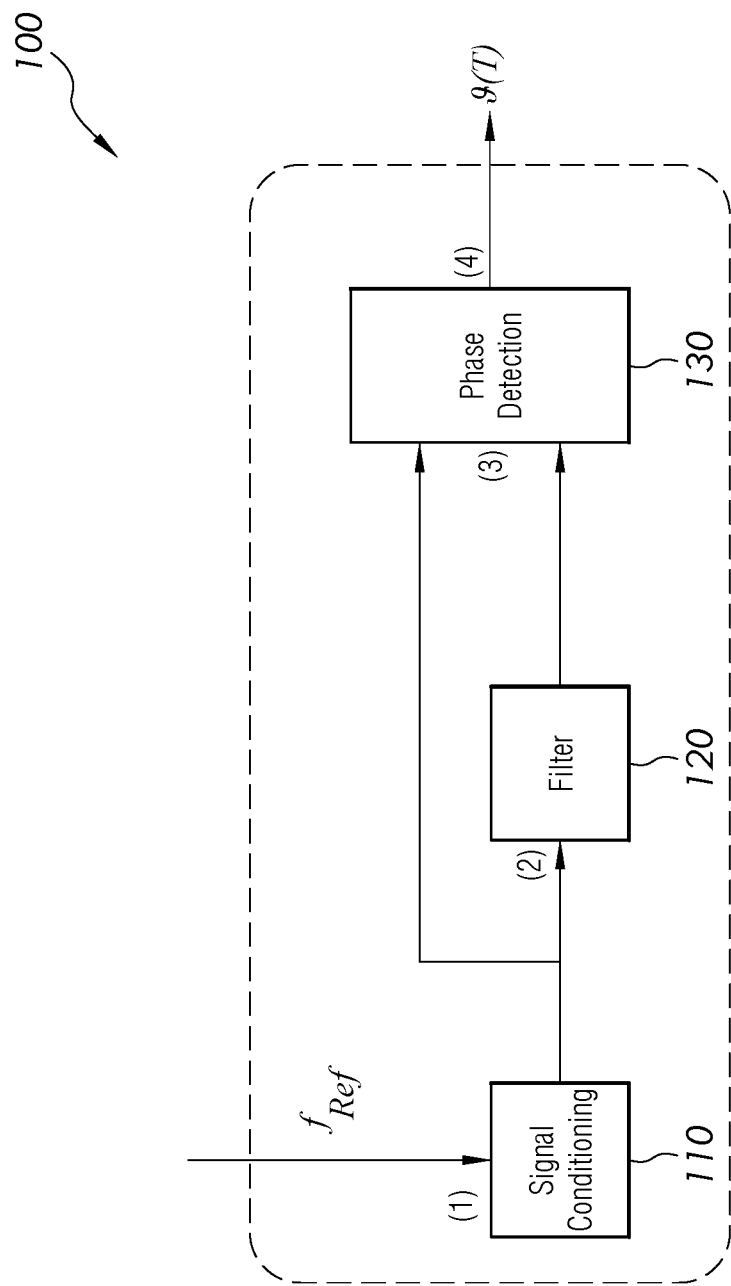
FIG. 1 illustrates a correction circuit according to an example embodiment.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

The systems and methods disclosed herein actively detect frequency shifts from a nominal value using a particular filter architecture in a correction circuit. The architecture uses the filter to produce a measurable phase shift near a nominal frequency of a MEMS resonator. The measured phase shift is used to create a frequency correction signal. The MEMS resonator may be configured to generate a reference clock ($f_{ref}$). The reference clock ($f_{ref}$) may be fed into signal conditioning circuitry, which allows for wave form manipulation, and outputs a conditioned signal. The conditioned signal is used as an input to a filter. The phase shift through the filter is a direct function of the absolute frequency. The input-to-output phase shifts as the frequency shifts away from a nominal value. The phase delta through the filter is detected in real-time by phase detector circuitry. The output of the phase detector circuitry is used as the frequency correction signal. When the filter is integrated with oscillators, the resulting system compensates for source of the shift in resonator frequency. Without limitation, the source of the resonator frequency shift may be due to, for example, heat/temperature, environmental stresses, and/or aging. In some examples, aging may refer to change of a nominal frequency of the resonator over a predetermined duration of time, which may be caused by physical changes to the resonator itself. These physical changes may be associated with specific components constituting the resonator, including but not limited to the body, springs, and/or damping sources. Detection and correction of the resonator frequency shift is an imperative function of maintaining a constant frequency.

In comparison with conventional frequency correction methods, the systems and methods disclosed herein offers several advantages. First, the correction signal is a direct function of the reference frequency alone. The correction signal will respond to a delta from the nominal frequency regardless of the source of the shift. The systems and methods disclosed herein may be used to correct for a wide range of frequency error sources, including but not limited to temperature, pressure, and aging. Second, there is no need to directly measure the temperature with a sensor that may introduce error in precision or accuracy. Third, the filter takes various configurations that allows for the ability to design application specific filter transfer functions. This allows for a particular correction signal with a high sensitivity. The systems and methods disclosed herein has a large sensitivity, low overall noise, and is configured to detect, in real-time, a resonator frequency shift regardless of the source.

For oscillators used in these applications, mechanical resonators (for example, micro-electromechanical systems (MEMS) resonators, nano-electromechanical systems (NEMS) resonators, bulk acoustic wave (BAW) resonators, surface acoustic wave (SAW) resonators, crystal (XTAL) resonators, film bulk acoustic resonators (FBAR), and the like) are desirable because the high Quality Factor (Q) results in low jitter and phase noise. On the other hand, the temperature stability performance of the mechanical resonators can suffer because the resonant frequency is dependent on the temperature-sensitive material properties of the resonator. For this reason, a frequency shift detector must be used to compensate for a frequency error (that is, deviation from the desired output frequency) due to temperature variation. Oscillators that employ temperature compensation of the output frequency, as disclosed herein, may be referred to as temperature compensated oscillators (TCXO). Thus, the phase measurement may be used to correct temperature changes.

FIG. 1 illustrates a correction circuit according to an example embodiment. The correction circuit 100 may comprise signal conditioning circuitry 110, a filter 120, and phase detector circuitry 130. Although FIG. 1 illustrates single instances of the components of the circuit 100, it is understood that any number of components of the circuit 100 may be included.

The signal conditioning circuitry 110 may be configured to receive a reference signal. In some examples, the reference signal may include a reference clock signal, such as a micro-electromechanical system (MEMS) resonator frequency ($f_{ref}$). The signal conditioning circuitry 110 may be configured to transmit one or more signals directly to the filter 120. For example, the signal conditioning circuitry 110 may be configured to directly transmit a conditioned signal to the filter 120. The signal conditioning circuitry 110 may be configured to transmit one or more signals directly to the phase detector circuitry 130. For example, the signal conditioning circuitry 110 may be configured to directly transmit a conditioned signal to the phase detector circuitry 130. In other examples, the signal conditioning circuitry 110 may be configured to generate and transmit one or more signals to the phase detector circuitry 130, without direct transmission. Moreover, the signal conditioning circuitry 110 may be configured to generate and transmit one or more signals to the filter 120, without direct transmission.

In some examples, the signal that is transmitted directly by the signal conditioning circuitry 110 to the filter 120 and the signal that is transmitted directly by the signal conditioning circuitry 110 to the phase detector circuitry 130 may each be conditioned by the signal conditioning circuitry 110. The signal conditioning circuitry 110 may be configured to condition the reference signal, prior to its input to the filter 120, by waveform manipulation including at least one selected from waveform squaring, amplitude modification, and frequency division or multiplication. Such conditioning of the reference signal by the signal conditioning circuitry 100 may be needed to optimally operate the filter 120, for example, to obtain an ideal signal-to-noise ratio of phase shift per unit frequency shift. In some examples, depending on the type of filter 120 used, the signal conditioning circuitry 110 may be configured to, for example, change amplitude, maintain a constant amplitude, etc., or change waveform, such as change from sine wave to square wave or vice versa). In some examples, a type of the signal conditioning circuitry 110 may depend on a type of the filter 120.

The filter 120 may be configured to filter the signal conditioned by the signal conditioning circuitry 110. For example, the filter 120 may be configured to filter the conditioned signal generated and transmitted by the signal conditioning circuitry 110. In particular, the filter 120 may be configured to shift the phase of its output with respect to its input, in which the phase shift is proportional to frequency shift from the nominal output frequency. The filter 120 may be configured to transmit the conditioned signal to the phase detector circuitry 130.

The phase detector circuitry 130 may be configured to receive a plurality of input signals and generate a least one output signal. In some examples, the phase detector circuitry 130 may be configured to receive a first input signal of the plurality of input signals, the first input signal comprising a signal that is not passed through the filter 120. The phase detector circuitry 130 may be configured to receive a second input signal of the plurality of input signals, the second input signal comprising the conditioned signal that is passed through the filter 120. In some examples, the phase detector circuitry 130 may be configured to receive both an unfiltered conditioned signal and a filtered conditioned signal. The phase detector circuitry 130 may be configured to detect a phase delta that represents a shift in input-to-output phase relative to a nominal value.

The phase detector circuitry 130 may be configured to generate the at least one output signal including a frequency correction signal. In some examples, the at least one output signal, or the frequency correction signal, may be a direct function of the reference signal. For example, the phase detector circuitry 130 may be configured to operate as a comparator that is configured to compare the phase and/or frequency of the received first and second input signals to produce the at least one output signal. More particularly, an output of the phase detector circuitry 130, such as the at least one output signal including the frequency correction signal, may include a signal that is proportional to the phase of the first and second input signals with respect to each other.

Figure 2:
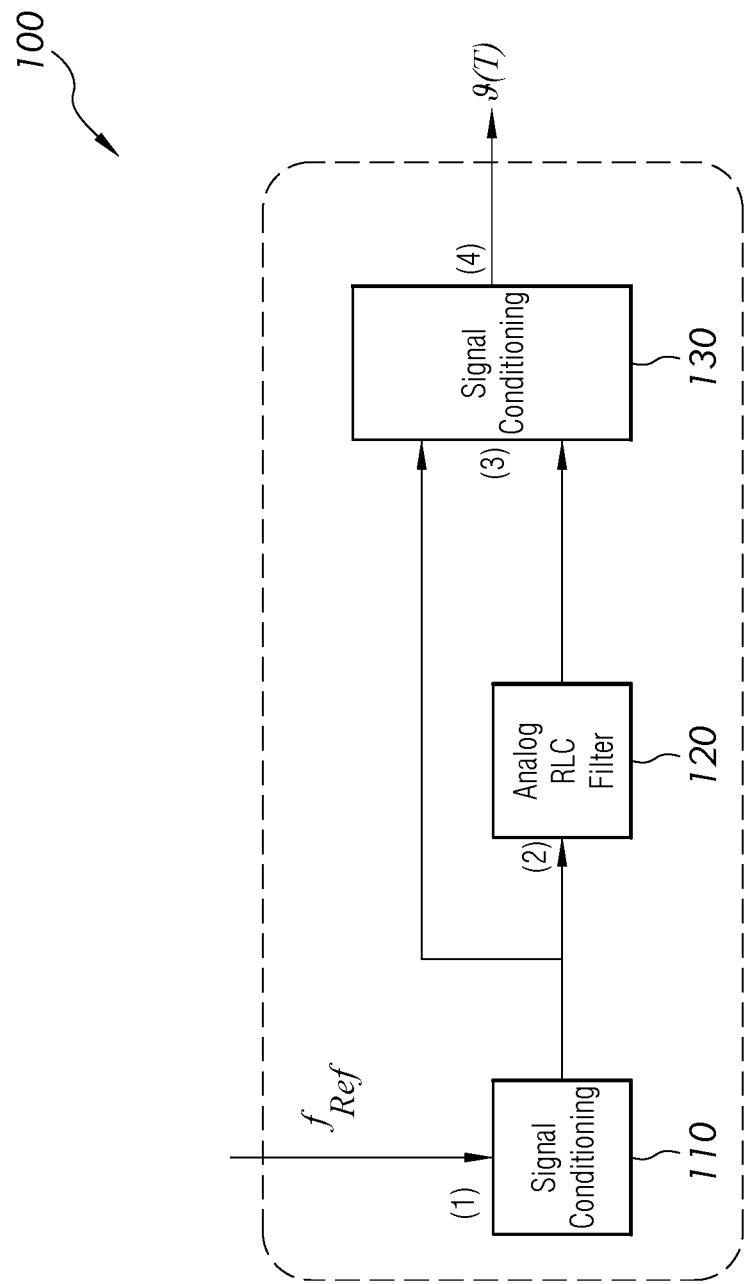
FIG. 2 illustrates a correction circuit according to another example embodiment.

FIG. 2 illustrates a correction circuit according to another example embodiment. FIG. 2 may reference the same components of circuit 100 as discussed above with respect to FIG. 1. Although FIG. 2 illustrates single instances of the components of the circuit 100, it is understood that any number of components of the circuit 100 may be included.

The signal conditioning circuitry 110 may be configured to receive a reference signal. In some examples, the reference signal may include a reference clock signal, such as a micro-electromechanical system (MEMS) resonator frequency ($f_{ref}$). The signal conditioning circuitry 110 may be configured to transmit one or more signals directly to the filter 120. For example, the signal conditioning circuitry 110 may be configured to directly transmit a conditioned signal to the filter 120. The signal conditioning circuitry 110 may be configured to transmit one or more signals directly to the phase detector circuitry 130. For example, the signal conditioning circuitry 110 may be configured to directly transmit a conditioned signal to the phase detector circuitry 130. In other examples, the signal conditioning circuitry 110 may be configured to generate and transmit one or more signals to the phase detector circuitry 130, without direct transmission. Moreover, the signal conditioning circuitry 110 may be configured to generate and transmit one or more signals to the filter 120, without direct transmission.

In some examples, the signal that is transmitted directly by the signal conditioning circuitry 110 to the filter 120 and the signal that is transmitted directly by the signal conditioning circuitry 110 to the phase detector circuitry 130 may each be conditioned by the signal conditioning circuitry 110. The signal conditioning circuitry 110 may be configured to condition the reference signal by waveform manipulation including at least one selected from waveform squaring, amplitude modification, and frequency division or multiplication. In some examples, depending on the type of filter 120 used, the signal conditioning circuitry 110 may be configured to, for example, change amplitude, maintain a constant amplitude, etc., or change waveform, such as change from sine wave to square wave or vice versa). In some examples, a type of the signal conditioning circuitry 110 may depend on a type of the filter 120.

The filter 120 may comprise an analog filter according to an exemplary embodiment. For example, the filter 120 may comprise an analog RLC filter. As explained above, the signal conditioning circuitry 120 may be configured to depend on the filter 120, and phase detector circuitry 130. For example, the analog RLC filter 120 may be consistent with a constant amplitude input via amplitude conditioning. The filter 120 may be configured to filter the conditioned signal. For example, the filter 120 may be configured to filter the conditioned signal generated and transmitted by the signal conditioning circuitry 110. The filter 120 may be configured to transmit the conditioned signal to the phase detector circuitry 130.

Figure 3:
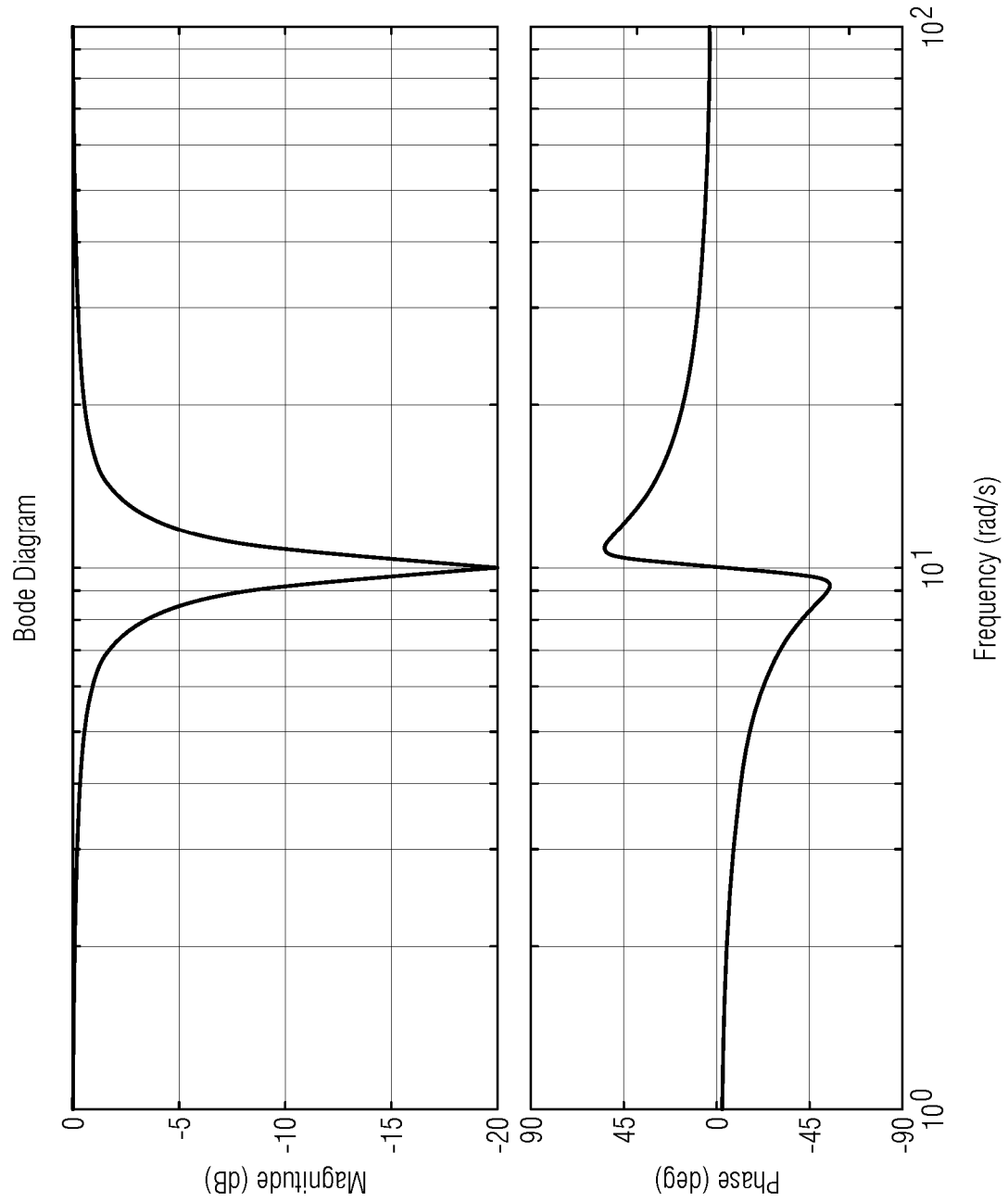
FIG. 3 illustrates a response of a filter according to an example embodiment.

FIG. 3 illustrates a response of a filter according to an example embodiment. As illustrated in FIG. 3, the filter 120 may include a high-order notch filter or bandpass filter that is configured to produce a steep phase response near the natural resonance. As further depicted in FIG. 3, the response may include a $2^{nd}$ order notch filter response. The filter 120 may be configured to use a switched-capacitor filter in the implementation of the response. The timing of switching circuits may be driven by the reference signal, such as a micro-electromechanical system (MEMS) resonator frequency ($f_{ref}$). This frequency ($f_{ref}$) may be configured to ensure that the filter response follows the resonance of the MEMS resonator. The resistor in the analog RLC filter 120 may be based on a switched capacitor circuit, in which the resistive value is linked directly to $f_{ref}$ and not the temperature, unlike implementations of ASIC-based resistors which are temperature-dependent.

The phase detector circuitry 130 may be configured to receive a plurality of input signals and generate a least one output signal. In some examples, the phase detector circuitry 130 may be configured to receive a first input signal of the plurality of input signals, the first input signal comprising a signal that is not passed through the filter 120. The phase detector circuitry 130 may be configured to receive a second input signal of the plurality of input signals, the second input signal comprising the conditioned signal that is passed through the filter 120. In some examples, the phase detector circuitry 130 may be configured to receive both an unfiltered conditioned signal and a filtered conditioned signal. The phase detector circuitry 130 may be configured to detect a phase delta that represents a shift in input-to-output phase relative to a nominal value.

The phase detector circuitry 130 may be configured to generate the at least one output signal including a frequency correction signal. In some examples, the at least one output signal, or the frequency correction signal, may be a direct function of the reference signal. For example, the phase detector circuitry 130 may be configured to compare the phase and/or frequency of the received first and second input signals to produce the at least one output signal.

Figure 4:
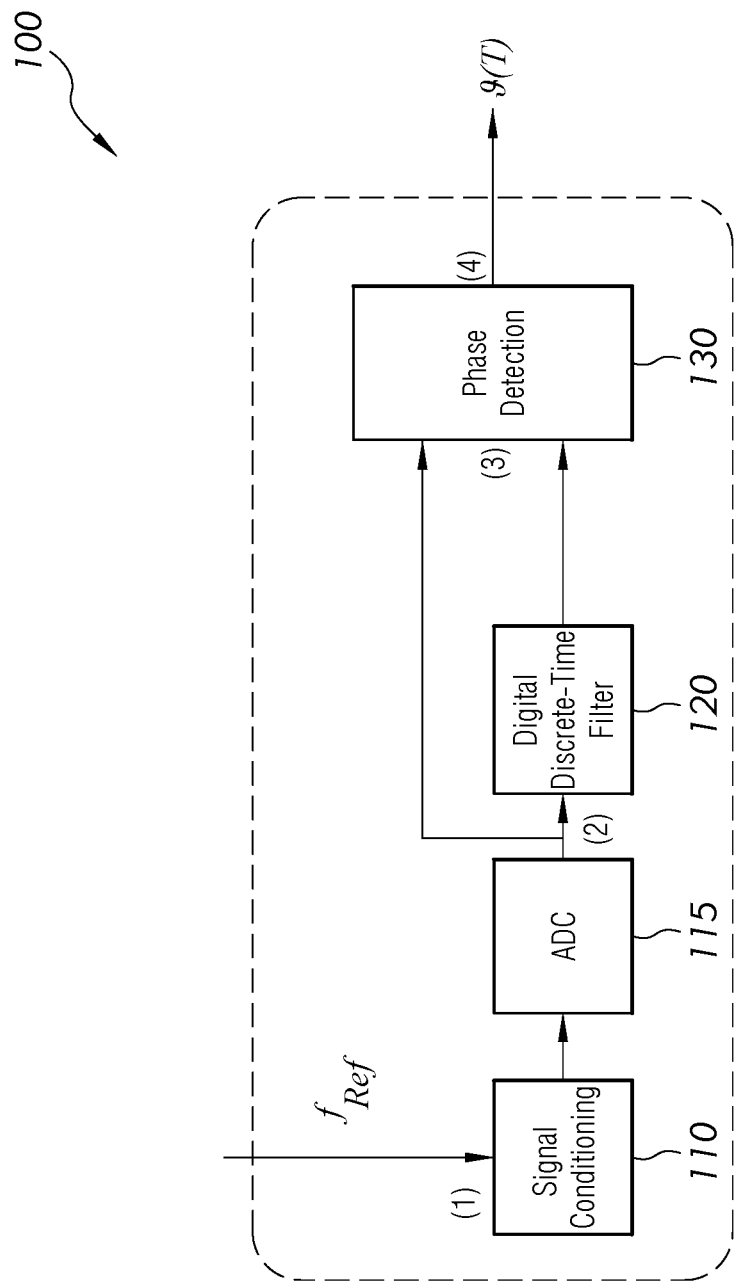
FIG. 4 illustrates a correction circuit according to another example embodiment.

FIG. 4 illustrates a correction circuit according to another example embodiment. FIG. 4 may reference the same components of circuit 100 as discussed above with respect to FIGS. 1-3. Although FIG. 4 illustrates single instances of the components of the circuit 100, it is understood that any number of components of the circuit 100 may be included. The correction circuit 100 may comprise signal conditioning circuitry 110, a converter 115, a filter 120, and phase detector circuitry 130.

The signal conditioning circuitry 110 may be configured to receive a reference signal. In some examples, the reference signal may include a reference clock signal, such as a micro-electromechanical system (MEMS) resonator frequency ($f_{ref}$). The signal conditioning circuitry 110 may be configured to transmit one or more signals to the filter 120 via a converter 115. For example, the signal conditioning circuitry 110 may be configured to transmit a conditioned signal to the filter 120 via a converter 115. The converter 115 may be configured to transmit one or more signals directly to the phase detector circuitry 130. For example, the converter 115 may be configured to directly transmit a conditioned, converted signal to the phase detector circuitry 130. In other examples, the converter 115 may be configured to convert and transmit one or more signals to the phase detector circuitry 130, without direct transmission.

In some examples, the signal that is transmitted directly by the converter 115 to the filter 120 and the signal that is transmitted directly by the converter 115 to the phase detector circuitry 130 may each be conditioned by the signal conditioning circuitry 110 and converted by the converter 115. The signal conditioning circuitry 110 may be configured to condition the reference signal by waveform manipulation including at least one selected from waveform squaring, amplitude modification, and frequency division or multiplication. In some examples, depending on the type of filter 120 used, the signal conditioning circuitry 110 may be configured to, for example, change amplitude, maintain a constant amplitude, etc., or change waveform, such as change from sine wave to square wave or vice versa). In some examples, a type of the signal conditioning circuitry 110 may depend on a type of the filter 120. As explained above, the signal conditioning circuitry 120 may be configured to depend on the filter 120, and phase detector circuitry 130.

The converter 115 may include an analog-to-digital (ADC) converter. In some examples, the converter 115 may or may not constitute a portion of the signal conditioning circuitry 110. To the extent that the converter 115 constitutes a portion of the signal conditioning circuitry 110, the signal conditioning circuitry 110 may be further configured to perform additional operations, including but not limited to sine-to-square wave conversion, as previously discussed above with respect to the signal conditioning circuitry. In some examples, the converter 115 may comprise a high-frequency ADC that is configured to capture the MEMS resonator frequency ($f_{ref}$), which allows for the filter response and phase delay to be processed in a DSP engine. In some examples, a digital-based discrete-time filter 120 and phase detector circuitry 130 may constitute the DSP engine (not shown), and the DSP engine may be configured to perform operations in addition to those by the filter 120 and phase detector circuitry 130. DSP clocking may be driven by the MEMS resonator frequency ($f_{ref}$), which may be configured to ensure the filter response follows the resonance of the MEMS resonator. In some examples, the converter 115 may be connected between the signal conditioning circuitry 110 and the filter 120.

The filter 120 may comprise a digital-based discrete-time filter according to an exemplary embodiment. The filter 120 may be configured to filter the conditioned and converted signal. For example, the filter 120 may be configured to filter the conditioned signal generated and transmitted by the signal conditioning circuitry 110, which may then be converted by converter 115. The filter 120 may be configured to transmit the filtered, converted signal to the phase detector circuitry 130. In particular, a digital bit stream input (analog-to-digital conversion) for the digital-based discrete-time filter 120 may be obtained through the converter 115. The converter 115 may be consistent with a constant amplitude input via amplitude conditioning, and clear transitions, such as sine-to-square wave conversion.

The phase detector circuitry 130 may be configured to receive a plurality of input signals and generate a least one output signal. In some examples, the phase detector circuitry 130 may be configured to receive a first input signal of the plurality of input signals, the first input signal comprising a signal that is not passed through the filter 120 but that is conditioned by the signal conditioning circuitry 110 and converted by converter 115. The phase detector circuitry 130 may be configured to receive a second input signal of the plurality of input signals, the second input signal comprising the conditioned and converted signal that is passed through the filter 120. In some examples, the phase detector circuitry 130 may be configured to receive both an unfiltered conditioned, converted signal and a filtered, converted conditioned signal. The phase detector circuitry 130 may be configured to detect a phase delta that represents a shift in input-to-output phase relative to a nominal value.

The phase detector circuitry 130 may be configured to generate the at least one output signal including a frequency correction signal. In some examples, the at least one output signal, or the frequency correction signal, may be a direct function of the reference signal. For example, the phase detector circuitry 130 may be configured to compare the phase and/or frequency of the received first and second input signals to produce the at least one output signal.

Figure 5:
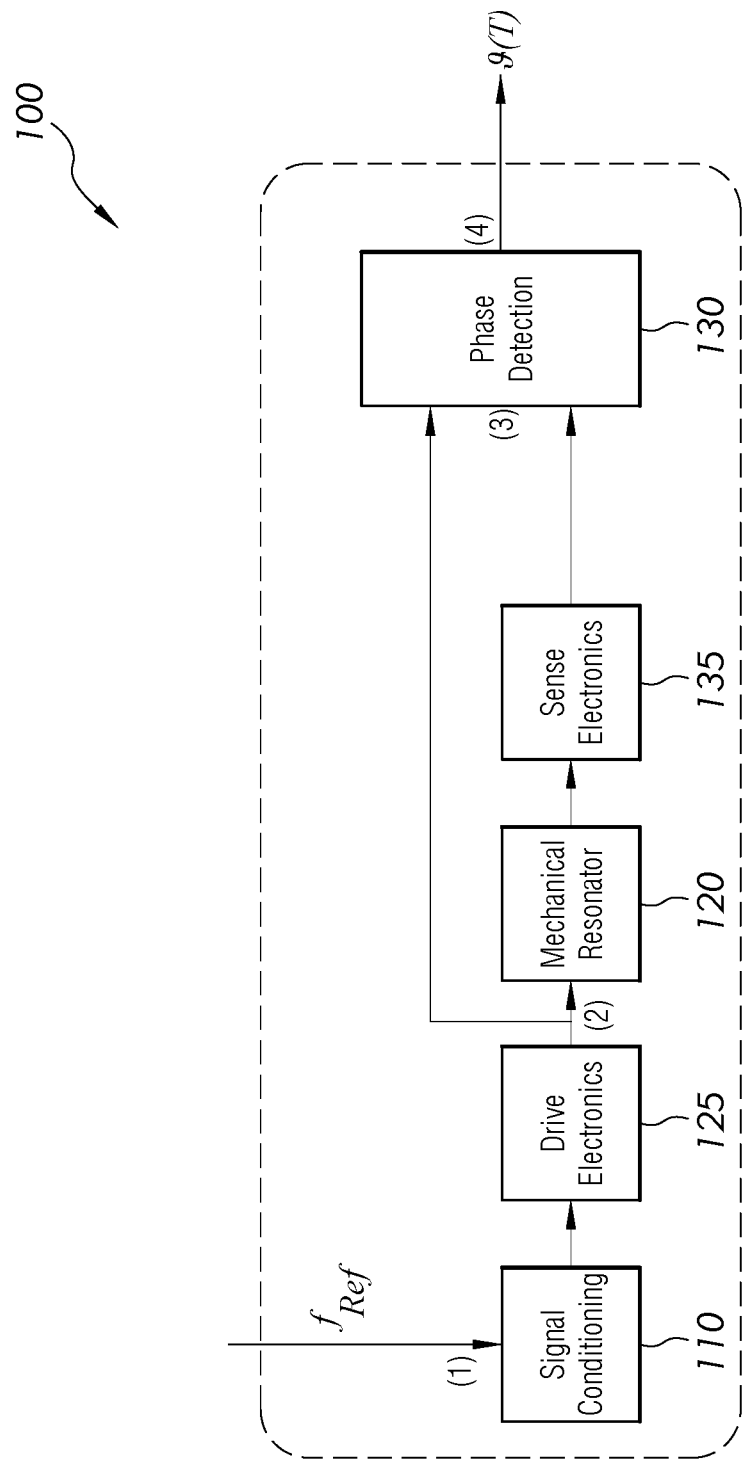
FIG. 5 illustrates a correction circuit according to another example embodiment.

FIG. 5 illustrates a correction circuit according to another example embodiment. FIG. 5 may reference the same components of circuit 100 as discussed above with respect to FIGS. 1-4. Although FIG. 5 illustrates single instances of the components of the circuit 100, it is understood that any number of components of the circuit 100 may be included. The correction circuit 100 may comprise signal conditioning circuitry 110, a filter 120, drive circuitry 125, phase detector circuitry 130, and sense circuitry 135.

The signal conditioning circuitry 110 may be configured to receive a reference signal. In some examples, the reference signal may include a reference clock signal, such as a micro-electromechanical system (MEMS) resonator frequency ($f_{ref}$). The signal conditioning circuitry 110 may be configured to transmit one or more signals to the filter 120 via drive circuitry 125. For example, the signal conditioning circuitry 110 may be configured to transmit a conditioned signal to the filter 120 via drive circuitry 125. The drive circuitry may be configured to transmit one or more signals directly to the phase detector circuitry 130. For example, the drive circuitry 125 may be configured to directly transmit a conditioned signal to the phase detector circuitry 130. In other examples, the drive circuitry 125 may be transmit one or more signals to the phase detector circuitry 130, without direct transmission. For example, the drive circuitry 125 may be configured to transmit one or more conditioned signals to the phase detector circuitry 130 via filter 120 and sense circuitry 135.

In some examples, the signal that is transmitted directly by the drive circuitry 125 to the phase detector circuitry 130 and the signal that is transmitted directly by the drive circuitry 125 to the filter 120 may each be conditioned by the signal conditioning circuitry 110. The signal conditioning circuitry 110 may be configured to condition the reference signal by waveform manipulation including at least one selected from waveform squaring, amplitude modification, and frequency division or multiplication. In some examples, depending on the type of filter 120 used, the signal conditioning circuitry 110 may be configured to, for example, change amplitude, maintain a constant amplitude, etc., or change waveform, such as change from sine wave to square wave or vice versa). In some examples, a type of the signal conditioning circuitry 110 may depend on a type of the filter 120.

The filter 120 may comprise a mechanical resonator filter according to an exemplary embodiment. For example, the filter 120 may comprise a MEMS-based resonator. As explained above, the signal conditioning circuitry 120 may be configured to depend on the filter 120, and phase detector circuitry 130. For example, for the mechanical resonator filter 120, the drive circuitry 125 may be needed so as to provide a low-impedance buffered output. To account for a temperature dependence of the resonator, the mechanical resonator may require a temperature-dependent drive amplitude. The drive circuitry 125 and the sense circuitry 135 may be configured to interface with the filter 120. In some examples, the drive circuitry 125 may or may not constitute a portion of the signal conditioning circuitry 110. To the extent that the drive circuitry 125 constitutes a portion of the signal conditioning circuitry 110, the signal conditioning circuitry 110 may be further configured to perform additional operations, including but not limited to amplitude control and/or signal conversion, as previously discussed above with respect to the signal conditioning circuitry 110.

Figure 6:
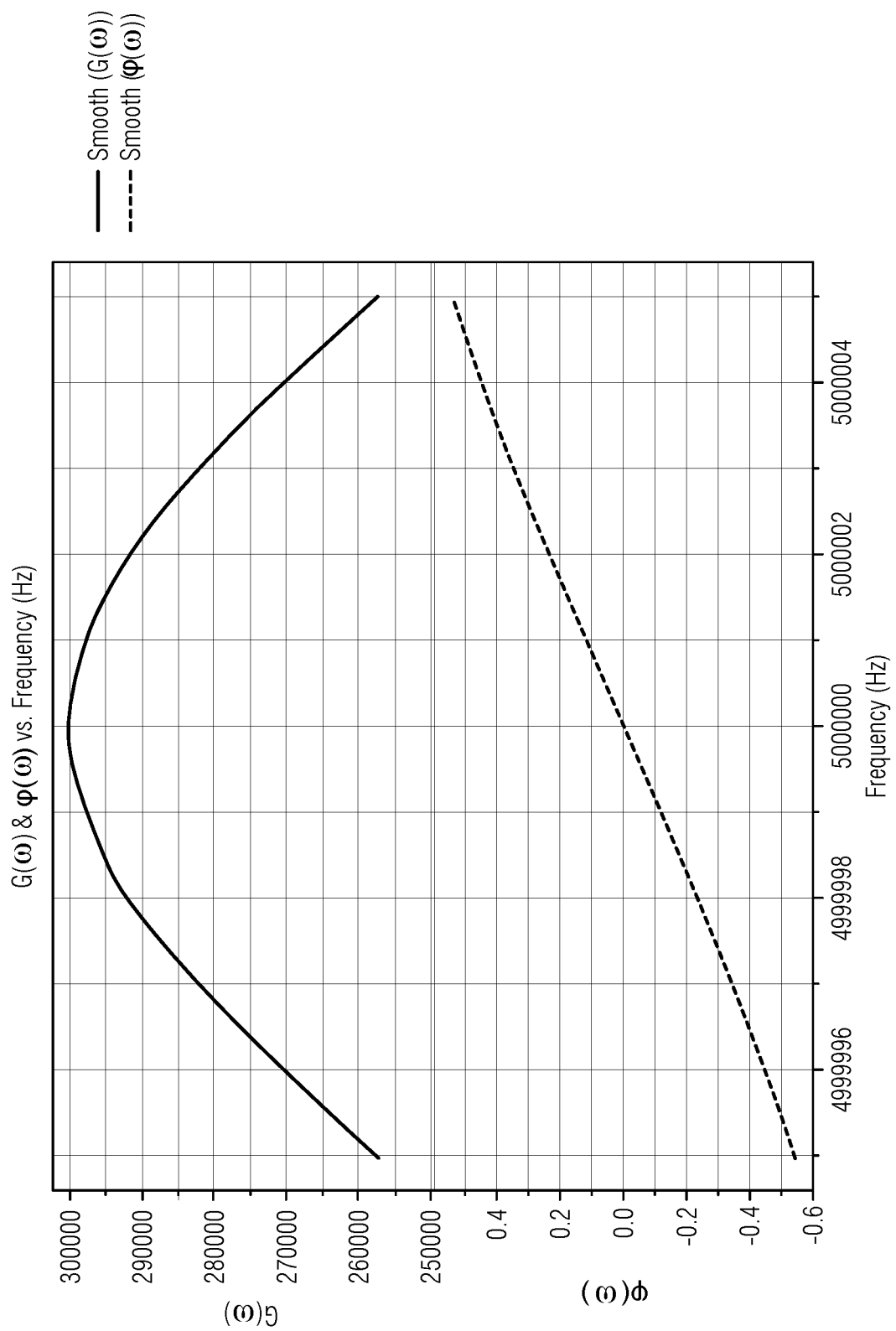
FIG. 6 illustrates a response according of a filter according to another example embodiment.

FIG. 6 illustrates a response according of a filter according to another example embodiment. In particular, FIG. 6 illustrates a high-quality MEMS resonator phase response. As depicted in FIG. 6, the filter 120 may be configured to have a high phase sensitivity near the MEMS resonator frequency ($f_{ref}$). In some examples, exposure to error sources, including but not limited to, stress and aging may be common between two resonators, which can reduce aging and accuracy concerns. These error sources may be further mitigated by manufacturing both resonators into the same body. In some examples, a resonator may operate at a single resonance mode, in which there may be two resonators formed out of a single common material substrate, such as silicon, in the case of a MEMS resonator. In other examples, a single body may operate at two or more resonance modes, in which case it may be referred to as two resonators manufactured out of the same body. The filter 120 may be configured to filter the conditioned signal that is driven by drive circuitry 125. For example, the filter 120 may be configured to filter the conditioned signal generated and transmitted by the signal conditioning circuitry 110. The filter 120 may be configured to transmit the conditioned signal to the phase detector circuitry 130 via sense circuitry 135. The drive circuitry 125 may be configured to amplify and buffer the reference signal conditioned by the signal conditioning circuitry 110. An output of the drive circuitry 125, including the amplified and buffered signal, may be configured to mechanically stimulate the resonate modes of the resonator so as to allow the resonator to have energy to sense the resonance. The sense circuitry 125 may be configured to amplify the measured resonance of the resonator. Because the output sense signals of the resonator of a MEMS mechanical resonator may be small, they must be amplified prior to being used by the phase detector circuitry 130. The drive circuitry 125 and the sense circuitry 135 may each include one or more amplifiers that are configured to carry out the respective amplification, as explained above.

The phase detector circuitry 130 may be configured to receive a plurality of input signals and generate a least one output signal. In some examples, the phase detector circuitry 130 may be configured to receive a first input signal of the plurality of input signals, the first input signal comprising a signal that is not passed through the filter 120. The phase detector circuitry 130 may be configured to receive a second input signal of the plurality of input signals, the second input signal comprising the conditioned signal that is passed through the filter 120. In some examples, the phase detector circuitry 130 may be configured to receive both an unfiltered conditioned signal and a filtered conditioned signal. The phase detector circuitry 130 may be configured to detect a phase delta that represents a shift in input-to-output phase relative to a nominal value.

The phase detector circuitry 130 may be configured to generate the at least one output signal including a frequency correction signal. In some examples, the at least one output signal, or the frequency correction signal, may be a direct function of the reference signal. For example, the phase detector circuitry 130 may be configured to compare the phase and/or frequency of the received first and second input signals to produce the at least one output signal.

Figure 7:
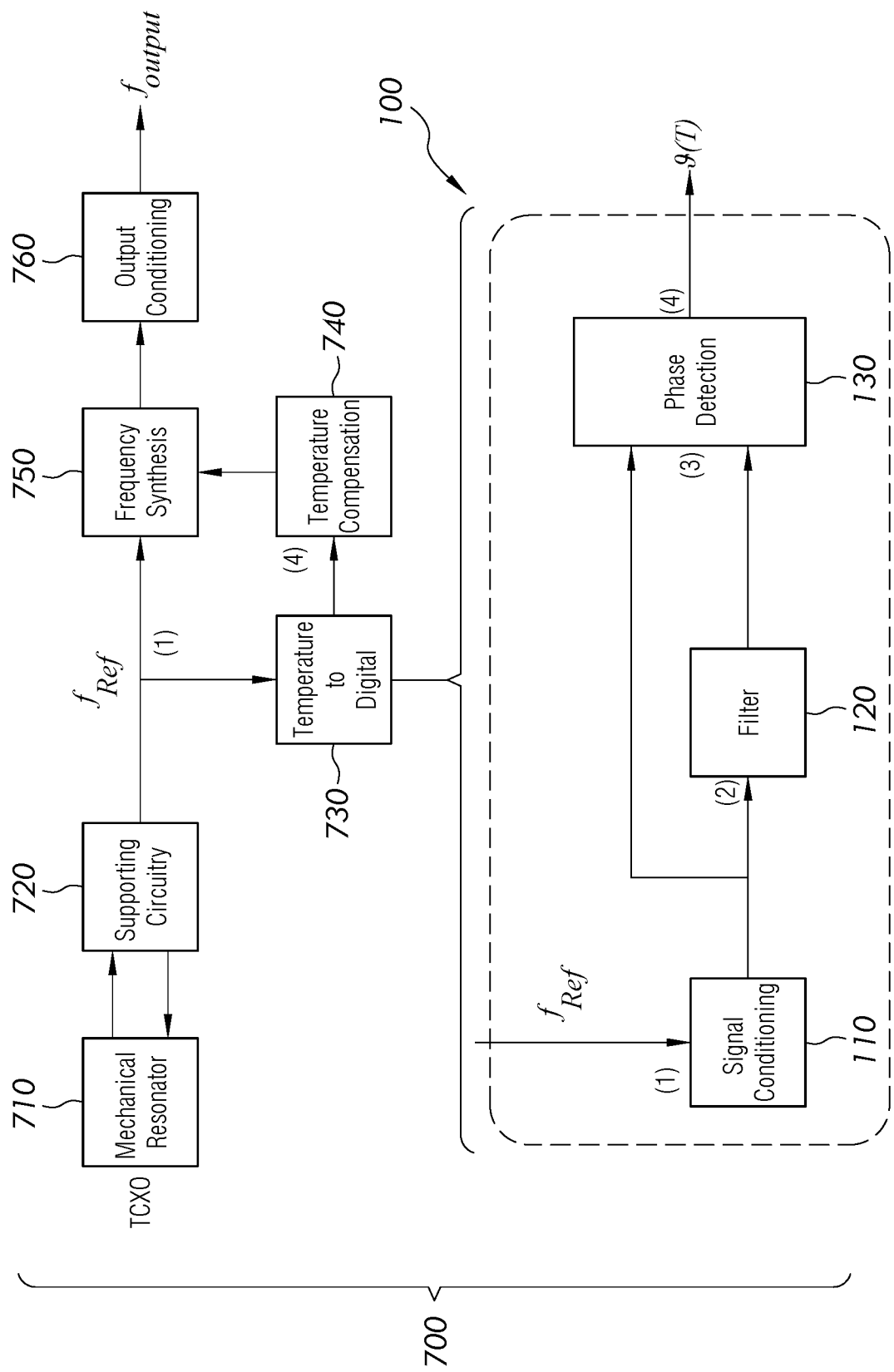
FIG. 7 illustrates an oscillator system according to an example embodiment.

FIG. 7 illustrates an oscillator system according to an example embodiment. As depicted in FIG. 7, an oscillator system 700 may include the correction circuit 100 according to an exemplary embodiment. Without limitation, the oscillator may comprise a temperature compensated oscillator, mechanical resonators (for example, micro-electromechanical systems (MEMS) resonators, nano-electromechanical systems (NEMS) resonators, bulk acoustic wave (BAW) resonators, surface acoustic wave (SAW) resonators, crystal (XTAL) resonators, film bulk acoustic resonators (FBAR), and the like). The oscillator 700 may include a mechanical resonator 710, supporting circuitry 720, a correction circuit 730, a temperature compensator 740, a frequency synthesizer 750, and output conditioner 760. The correction circuit 730 may include any of the correction circuits 100, including any of the filters 120, as previously described above. By way of example, the supporting circuitry 720 may include drive circuitry and/or sense circuitry, similar to drive circuitry 125 and sense circuitry 135, as previously explained above. The frequency synthesizer 750 may be configured to include a phase-locked loop (PLL), such as a fractional-N PLL circuit, and a time-domain divider. The output conditioner 760 may be configured to provide a buffered output ($f_{output}$) to a device user. The output conditioner 760 may be configured to include a signal converter. In some examples, the buffered output ($f_{output}$) of the output conditioner 760 may include a low voltage (CMOS clipped sine wave output.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A correction circuit, comprising:
signal conditioning circuitry that is configured to condition a received reference signal;
a filter that is configured to filter the conditioned signal received from the signal conditioning circuitry; and
phase detector circuitry that is configured to generate at least one output signal based on measuring a phase shift between a received plurality of input signals, at least one of the plurality of input signals comprising the conditioned signal received from the filter.

2. The correction circuit of claim 1, wherein the reference signal includes a reference clock signal.

3. The correction circuit of claim 1, wherein the phase detector circuitry is configured to receive a first input signal of the plurality of input signals, the first input signal comprising a signal that is not passed through the filter.

4. The correction circuit of claim 3, wherein the phase detector circuitry is configured to receive a second input signal of the plurality of input signals, the second input signal comprising the conditioned signal that is filtered by the filter.

5. The correction circuit of claim 1, wherein the signal conditioning circuitry is configured to condition the reference signal by waveform manipulation including at least one selected from waveform squaring, amplitude modification, and frequency division or multiplication.

6. The correction circuit of claim 1, wherein the phase detector circuitry is configured to generate the at least one output signal including a frequency correction signal.

7. The correction circuit of claim 1, wherein the at least one output signal is a direct function of the reference signal.

8. The correction circuit of claim 1, wherein the filter comprises an analog filter.

9. The correction circuit of claim 8, wherein the analog filter comprises a bandpass filter.

10. The correction circuit of claim 1, wherein the filter comprises a digital filter.

11. The correction circuit of claim 10, wherein the digital filter comprises a discrete-time filter.

12. The correction circuit of claim 10, further comprising a converter that is connected between the signal conditioning circuitry and the digital filter.

13. The correction circuit of claim 1, wherein the filter comprises a mechanical resonator filter.

14. The correction circuit of claim 13, further comprising drive circuitry and sense circuitry.

15. The correction circuit of claim 14, wherein the phase detector circuitry is configured to receive an output directly from the drive circuitry.

16. The correction circuit of claim 1, wherein the phase detector circuitry is configured to detect a phase delta that represents a shift in input-to-output phase relative to a nominal value.

17. The correction circuit of claim 1, wherein a type of the signal conditioning circuitry depends on a type of the filter.

18. A method comprising:
transmitting a reference signal;
conditioning the reference signal;
filtering the conditioned reference signal;
transmitting the filtered conditioned signal;
measuring a phase shift between the filtered conditioned signal and a second signal;
generating an output signal including a frequency correction signal; and
transmitting the frequency correction signal.

19. An oscillator comprising:
a mechanical resonator;
a correction circuit; and
output conditioner circuitry, wherein the correction circuit includes:
    signal conditioning circuitry that is configured to condition a reference signal received from the mechanical resonator;
    a filter that is configured to filter the conditioned signal received from the signal conditioning circuitry; and
    phase detector circuitry that is configured to generate at least one output signal based on measuring a phase shift between a received plurality of input signals, at least one of the plurality of input signals comprising the conditioned signal received from the filter, the phase detector circuitry further configured to transmit the at least one output signal to the output conditioner circuitry.

20. The oscillator of claim 19, wherein the oscillator is a temperature compensated oscillator.

* * * * *